United States Patent Office 3,740,189
Patented June 19, 1973

3,740,189
BLACK DYE FORMULATION CONTAINING THREE MONO-AZO DYES
Nagib A. Doss, Loudonville, N.Y., and Roberta Marie Tremain, Easton, Pa., assignors to GAF Corporation, New York, N.Y.
No Drawing. Filed Sept. 17, 1970, Ser. No. 73,235
Int. Cl. C09b 45/48; D06p 1/02
U.S. Cl. 8—26         4 Claims

ABSTRACT OF THE DISCLOSURE

A black dye formulation comprising a blue dye, an orange or yellow brown dye and a red dye component the dye components being present in proportions suitable for obtaining a black dyestuff which is suitable for application to fibers which will be subjected to durable press treatment, the blue dye component being a compound represented by the formula

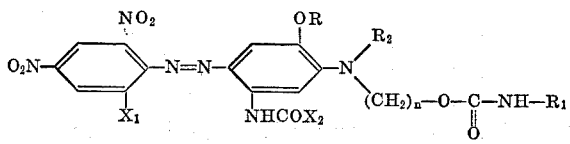

wherein $X_1$ is chlorine, bromine or cyano;
$X_2$ is lower alkyl or phenyl;
R is lower alkyl;
$R_1$ is lower alkyl or lower alkenyl;
$R_2$ is hydrogen, lower alkyl or $C_{2-3}$ alkyl substituted by —OCONHR$_1$; and
$n$ is 2 or 3;

the orange or yellow brown dye component being a compound represented by the formula

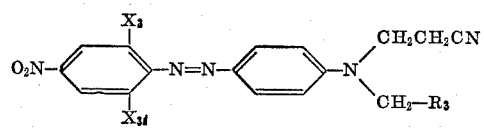

wherein $X_3$ and $X_3'$ are individually chloro or bromo; and
$R_3$ is —CH$_2$OCOR$_4$, —CH$_2$OCONHR$_5$, —CHOHCH$_2$Cl or —CH—(CH$_2$Cl)OCOR$_4$, R$_4$ being lower alkyl or phenyl, and R$_5$ being C$_1$-C$_4$ alkyl, C$_2$-C$_4$ alkenyl or phenyl;

and the red dye component being a compound represented by the formula:

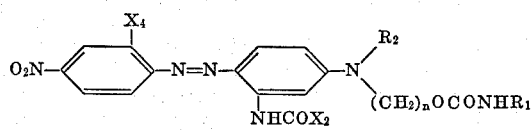

wherein $X_4$ is H, Cl, Br and CN;
$X_2$ is as defined above;
$R_1$ is as defined above;
$R_2$ is as defined above;
$n$ is as defined above.

This invention relates to new black dye formulations. More particularly, it relates to a black dye formulation which resists shade change and loss of stability during durable press treatment of dyed textile materials. This invention relates further to textile materials which are dyed with the black dye formulations of this invention.

In order for a dyestuff to be satisfactory for commercial use, it must be stable with regard to light, washing, perspiration, gas, ozone and crocking.

Fastness to gas and ozone exposure is necessary to minimize undesirable changes in shade or losses of depth resulting from the presence of gas and ozone in the atmosphere. Accelerated fading tests are available to measure the stability of dyes to both gas and ozone.

The gas exposure test is designed to show the effect of oxides of nitrogen in the atmosphere on the dyestuff. One standard fading cycle is established as being approximately equivalent to a six months exposure to the atmosphere in southern New Jersey. Thus, if a dyed fabric withstands 2 cycles of gas exposure, it should show no color change for 12 months under normal wearing conditions.

Gas fastness is of importance during application of the dyestuff and curing of durable press finishes. Most mills heat their curing and drying ovens with gas rather than with electricity. Thus, the dyestuff is exposed to oxides of nitrogen before it reaches the consumers' hands.

Gas fastness is also of importancse in industrial areas with heavy concentrations of fumes or in areas where natural gas is the main fuel used for heating homes. The agent which causes gas fading has been identified as nitrogen dioxide.

The main effect of gas fading is quite often a change in shade. For example, the anthraquinone blues are characterized by going redder and duller when gas faded. The reaction is nitration, nitrosation, diazotization or oxidation.

Ozone fading is a pure oxidative reaction. There is very seldom a shade change noted in ozone fading. A loss in depth is the usual manifestation.

Ozone fading is more prevalent where there is not a high industrial concentration since in highly industrialized areas the ozone readily reacts with sulfur dioxide, smoke and organic particles in the air since it is a strong oxidizing agent. Ozone fading is intensified in areas where high humidity is dominant.

With the present levels of air pollution, gas and ozone fading are becoming more prominent problems.

Where the dyestuff is to be applied to a fabric on which a durable press finish is to be superimposed, the dyestuff must be endowed with the additional attribute of chemical stability and resistance to sublimation. Since durable press finishing is widely practiced in the textile field, especially in connection with polyester-cellulosic fiber blends, and since durable press finishing involves stringent conditions which are very demanding of the dyestuffs applied to the fabric, it is becoming more important with the passage of time to take into consideration the effect of durable press finishing upon the other properties of the dyestuff.

Dyestuffs to be used on fabrics which are to receive a durable press finish must be selected on the basis of sublimation fastness and heat stability in order to withstand the high temperatures involved in applying the durable press finish. In many cases, a dyestuff which has sufficient chemical resistance before being subjected to the high temperatures involved in durable press finishing, may be unacceptable in the same respect after the durable press finish is applied to the fabric.

The problem of choosing a dyestuff which can be advantageously used to dye durable press fabrics is much greater when a mitxure of dyestuffs is employed, for example, in order to produce a black shade, since then any one of the components of the black dye formulation can be unstable in one or more respects, and cause a shade change to occur either immediately after the durable press finish is applied or later, as the component dye changes during the use of the dyed fabric.

The problem thus exists in finding component dyestuffs which can be compatibly blended to form stable black dye formulations which do not undergo undesirable shade changes as a result of being subjected to durable press treatment.

It is an object of this invention to provide a mixture of dyes which gives a black dye which is fast to light, washing, perspiration, gas, ozone and crocking, and is capable of resisting shade change when dyed onto polyester-cellulosic fabrics subjected to durable press treatment. Other objects will be apparent from the ensuing description of this invention.

There is provided in accordance with this invention a mixture of a blue dye, an orange or yellow brown dye, and a red dye, this mixture having the desired properties for coloring durable press polyester-cellulosic fabrics.

The blue dye component of the black dye formulation of this invention is represented by the following Formula I:

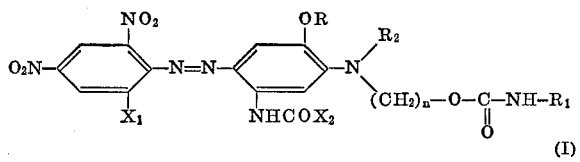

(I)

wherein $X_1$ is chlorine, bromine or cyano;
$X_2$ is lower alkyl or phenyl;
R is lower alkyl;
$R_1$ is lower alkyl or lower alkenyl;
$R_2$ is hydrogen, lower alkyl or $C_{2-3}$ alkyl substituted by —OCONHR$_1$; and
$n$ is 2 or 3.

These blue dyes are fully disclosed in copending application Ser. No. 803,426, filed Feb. 28, 1969.

Preferred blue dyes are those wherein $X_1$ is Cl
$X_2$ is lower alkyl
R is methyl or ethyl
$R_1$ is methyl or ethyl
$R_2$ is $R_1NHCOO(CH_2)_n$—;
$n$ is 2 or 3.

The orange or yellow brown dye component of the black dye formulation of this invention is represented by the Formula II:

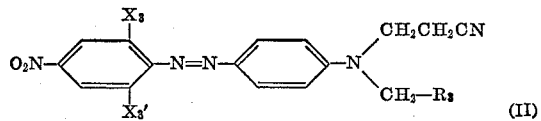

(II)

wherein $X_3$ and $X_3'$ are individually chloro or bromo;
$R_3$ is —CH$_2$OCOR$_4$, —CH$_2$OCONHR$_5$, —CHOHCH$_2$Cl or —CH—(CH$_2$Cl)OCOR$_4$, $R_4$ being lower alkyl or phenyl; and $R_5$ being $C_1$–$C_4$ alkyl, $C_2$–$C_4$ alkenyl or phenyl.

These orange and yellow brown monoazo dyes are known compounds which have generally been described, for example, in application Ser. No. 803,427, filed Feb. 28, 1969.

Preferred orange and yellow brown dyes are those wherein $X_3$ and $X_3'$ are chloro; and
$R_3$ is CH$_2$OCOR$_4$ wherein
 $R_4$ is methyl or ethyl.

The red dye component of the black dye formulation of this invention is represented by the Formula III:

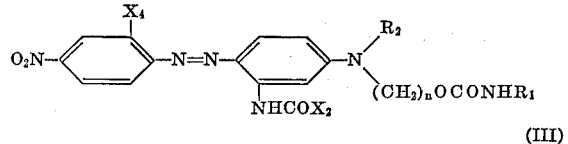

(III)

wherein $X_4$ is H, Cl, Br or CN;
$X_2$ is as defined above;
$R_1$ is as defined above;
$R_2$ is as defined above; and
$n$ is as defined above.

These red monoazo dyestuffs are described in copending application Ser. No. 803,427, referred to above.

The preferred red dyes for use in the present invention are those wherein $X_4$ is Cl;
$X_2$ is lower alkyl;
$R_2$ is —CH$_2$CH$_2$OCONH—alkyl;
$R_1$ is lower alkyl; and
$n$ is 2.

The black dye is formulated by combining the component blue, orange or yellow brown, and red dyes in the following proportions by weight

| Color: | Proportion, parts |
|---|---|
| Blue | 50–80 |
| Orange or Yellow Brown | 20–50 |
| Red | 2–20 |

The dye formulation of this invention is suitable for application to many types of synthetic and natural materials, but it is preferred for use in dyeing textile materials, most preferably durable press fabrics, especially those containing cotton and polyester fibers.

The dyestuff formulations may be applied by well-known disperse or suspension dyeing techniques from an aqueous dispersion in the presence of a dispensing agent at elevated temperatures. Moreover, the dyestuffs are suitable for application by high temperature dyeing processes, such as are described in U.S. Pats. 2,415,379, 2,447,993, 2,487,197 and 2,663,612. In the process described in these patents, the fabric to be dyed is impregnated at a relatively low temperature with an aqueous dispersion of the dyestuff that advantageously contains 1 to 50% of urea and a thickening agent, such as sodium alginate or, more often, a copolymer derived from acrylic acid. The fabric is then squeeze dried in a manner such as to retain over 50% of the dye liquor and the fabric is then heated at a temperature of 375° to 450° F.

Moreover, in view of the high level of sublimation fastness possessed by the black dye formulations of the present invention, they are considered particularly useful for coloring polyester and polyester-cotton blends which are to be treated to impart durable press finish thereto. As an example of such a treatment, one process involves padding the fabric with a paste comprising 25% to about 38% of dihydroxydimethylolethyleneurea, a buffered zinc nitrate catalyst, a polyethylene emulsion, a mixture containing nonionic and amphoteric surfactants and an acrylic copolymer emulsion to impart abrasion resistance to the fabric. The padded fabric is then dried at 275° F. and cured for 15 minutes at 340° F. It can be seen from the foregoing description of the durable press treatment that the fabric and the dyestuff applied thereto are both subjected to extremely high temperatures which would cause loss of dyestuff by sublimation. However, in view of the resistance of the dyestuff formulation of the present invention to sublimation, loss by sublimation and concomitant shade changes are reduced to a minimum. Likewise, notwithstanding the high temperatures to which these dyes are subjected, the fastness of the dye formulation to chemical degradation, e.g., ozone, is substantially retained at the same level as if no high temperature processing had been involved.

The following examples are presented to further illustrate the present invention. In the examples, three commercial blacks were used for purposes of comparison. They are:

Commercial Black 1: Foron Black S–K u.d. (Sandoz)
Commercial Black 2: Eastman Polyester Black 3G–LSW Paste (Eastman)
Commercial Black 3: Polydye Black SF–QT (Inmont)

These dyes are mixtures of several components. The specific composition of the Inmont black is not known, but in all probability, it is Polydye Orange YD–SF which has the same chemical structure as Foron Yellow Brown S–2RFL.

It is believed that the Sandoz and Eastman dyes are constituted as follows:

Foron Black S–K:
　Foron Navy S–2GL (C.I. Disperse Blue 79)
　Foron Yellow Brown S–2RFL (C.I. Disperse Orange 30)
　Eastman Polyester Black 3G–LSW Paste
　Eastman Polyester Navy 2RLSW
　Eastman Polyester Yellow BR–LSW
　Eastman Polyester Brilliant Rubine R–LSW (C.I. Disperse Violet 42)

All parts and proportions are on a weight basis unless otherwise stated.

EXAMPLE 1

A mixture was prepared consisting of: 55 parts by weight of a dispersed paste containing approximately 13% pure dyestuff having the formula:

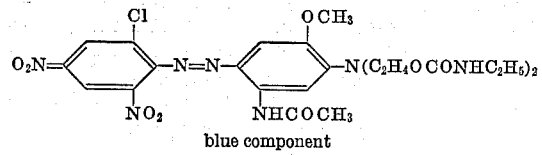
blue component 35 parts by weight of a dispersed paste containing approximately 17% pure dyestuff having the formula:

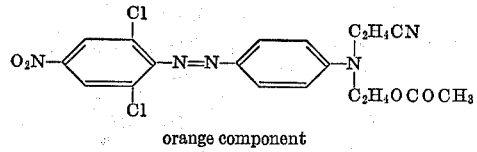
orange component and 10 parts by weight of paste containing about 16% pure dyestuff having the formula:

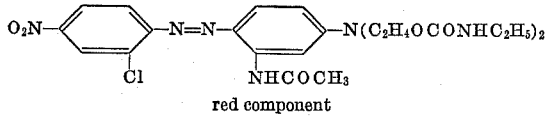
red component

The dye formulation was applied by the following thermofixing method: A padding liquor was prepared at a concentration of 16 oz./gal. with the addition of 4.0 oz./gal. of a sodium alginate thickener and 0.2 oz./gal. of a sodium salt of sulfated nonylphenoxy poly(ethyleneoxy) ethanol.

Polyester-cotton fabric was padded with this liquor at 60° C., dried, and submitted to hot air at 220° C. for 90 seconds.

The fabric was then padded with 10 oz./gal. sodium sulfide and 5 oz./gal. sodium carbonate (approximately 100% wet pickup), steamed 1 minute at 220° F. and soaped 1 minute at 212° F. with 1 lb./100 gal. non-ionic surfactant and 2 lbs./100 gal. sodium carbonate. It was thereafter rinsed and dried.

A durable press finish of the following formulation was applied to the dyed fabric:

| | Percent by weight |
|---|---|
| Dihydroxy dimethylolethyleneurea | 25.0 |
| Zinc nitrate | 5.0 |
| Polyethylene emulsion | 2.0 |
| Reactive ampholytic polymer | 6.0 |
| Acrylic latex | 2.0 |
| Non-ionic nonylphenoxy poly(ethyleneoxy)ethanol | 0.25 |

The fabric was padded at 105° F. (41° C.)) with 55% wet pick-up, dried, and cured 12 minutes at 325° F. (163° C.).

Both a swatch of fabric treated with the durable press finish and an untreated swatch were characterized by excellent sublimation properties, ozone and gas fastness. Light and wet-fastness properties were good.

EXAMPLE 2

Example 1 was repeated except that the orange component was replaced by the same amount of a dyestuff having the formula:

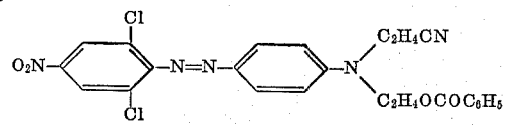

The fastness properties and shade of the resulting dyeing were similar to Example 1.

EXAMPLE 3

This is a comparision of the dyes of Examples 1 and 2 against commercial black dyes.

Comparative dyeings were made on polyester-cotton swatches in the manner of Example 1 followed by durable press (DP) treatment as described in Example 1. An ozone fastness test was made according to the manner of AATCC Test Method 109–1963, Color Fastness to Ozone in the Atmosphere. In these tests 5 shows negligible or no change in color, the lower the number, the greater the color change.

| Dyestuff | Change of shade due to DP | Fastness to 4 cycles ozone exposure | |
|---|---|---|---|
| | | Before DP | After DP |
| Commercial Black: | | | |
| 1 | 3–4 | 4–5 | 3 |
| 2 | 3–4 | 4–5 | 3 |
| 3 | 3 | 4–5 | 2–3 |
| Example: | | | |
| 1 black | 3 | 4–5 | 4 |
| 2 black | 3–4 | 4–5 | 4 |

From these tests, it was determined that the dyes of Examples 1 and 2 have greater shade stability on durable press treatment, and greater stability in the ozone test than the three commercial dyes.

EXAMPLE 4

The dyestuff mixture of Example 1 was employed to dye polyester-cotton fabric by the thermofixing dyeing method described in Example 1.

A durable press treatment was carried out exactly as described in Example 1 with the exception that magnesium chloride was substituted as catalyst in place of the zinc nitrate. The following readings were reported:

| Dyestuff | Change of shade due to DP | Fastness to 4 cycles ozone exposure | |
|---|---|---|---|
| | | Before DP | After DP |
| Commercial Black: | | | |
| 1 | 3 | 4–5 | 2 |
| 2 | 3 | 4–5 | 3 |
| 3 | 2 | 4–5 | 2–3 |
| Example: | | | |
| 1 black | 3 | 4–5 | 4–5 |
| 2 black | 3–4 | 4–5 | 4–5 |

Thus it is seen that the dyes of Examples 1 and 2 are equivalent to or better than the commercial dyes with respect to shade change, and more stable to ozone exposure than the commercial dyes.

EXAMPLE 5

Example 1 was repeated except that the orange component was replaced by the same amount of a dyestuff having the formula:

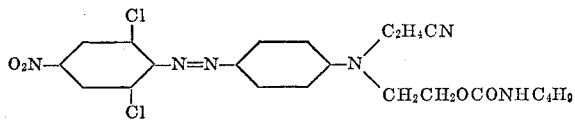

The fastness properties and shade of the resulting dyeing were similar to Example 1.

What is claimed is:

1. A water insoluble black dye formulation comprising a blue dye, an orange or yellow brown dye and a red dye component, the dye components being present in proportions suitable for obtaining a black dyestuff which is suitable for application to fibers which will be subjected to durable press treatment, the blue dye component being a compound represented by the formula

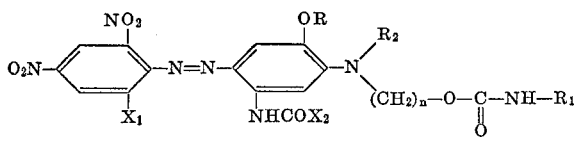

wherein
$X_1$ is chlorine, bromine or cyano;
$X_2$ is lower alkyl or phenyl;
$R$ is lower alkyl;
$R_1$ is lower alkyl or lower alkenyl;
$R_2$ is hydrogen, lower alkyl or $C_{2-3}$ alkyl substituted by $-OCONHR_1$; and
$n$ is 2 or 3;

the orange or yellow brown dye component being a compound represented by the formula

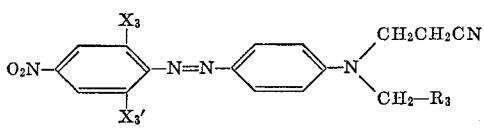

wherein
$X_3$ and $X_3'$ are individually chloro or bromo; and
$R_3$ is $-CH_2OCOR_4$, $-CH_2OCONHR_5$, $-CHOHCH_2Cl$ or $-CH-(CH_2Cl)OCOR_4$, $R_4$ being lower alkyl or phenyl, and $R_5$ being $C_1-C_4$ alkyl, $C_2-C_4$ alkenyl or phenyl;

and the red dye component being a compound represented by the formula:

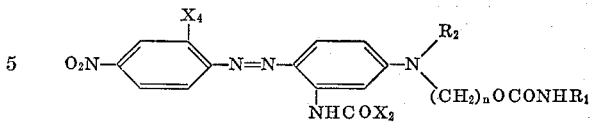

wherein
$X_4$ is H, Cl, Br or CN;
$X_2$ is as defined above;
$R_1$ is as defined above;
$R_2$ is as defined above;
$n$ is as defined above.

2. The black dye formulation of claim 1 wherein
$X_1$ is Cl
$X_2$ is lower alkyl
$R$ is methyl or ethyl
$R_1$ is methyl or ethyl
$R_2$ is $R_1NHCOO(CH_2)_n-$; and
$n$ is 2 or 3.

3. The dye formulation of claim 1 wherein
$X_3$ and $X_3'$ are chloro; and
$R_3$ is $-CH_2OCOR_4$ wherein $R_4$ is methyl or ethyl.

4. The dye formulation of claim 1 wherein
$X_4$ is Cl
$X_2$ is lower alkyl
$R_2$ is $-CH_2CH_2OCONH-$alkyl
$R_1$ is lower alkyl and
$n$ is 2.

References Cited
UNITED STATES PATENTS

| | | | |
|---|---|---|---|
| 3,406,164 | 10/1968 | Altermath et al. | 260—207.1 |
| 3,342,803 | 9/1967 | Artz et al. | 260—207 |
| 3,268,507 | 8/1966 | Kruckenberg et al. | 260—207 |
| 3,097,198 | 7/1963 | Fishwisk et al. | 260—207 |
| 2,891,942 | 6/1959 | Merian | 260—207 |
| 3,413,075 | 11/1968 | Rotcop et al. | 8—26 |
| 3,264,052 | 8/1966 | Rhyner | 8—26 |
| 3,207,569 | 9/1965 | Thummel | 8—25 |
| 3,232,693 | 2/1966 | Lange et al. | 8—26 |

FOREIGN PATENTS

| | | | |
|---|---|---|---|
| 824,443 | 1959 | Great Britain | 260—207.1 |
| 423,009 | 1967 | Japan | 260—207.1 |
| 435,672 | 1968 | Japan | 260—207.1 |

OTHER REFERENCES

J.S.D.C., July 1965, IV.—Raw Materials, Intermediates; Colouring Matter, p. 334.

J. TRAVIS BROWN, Primary Examiner

J. P. BRAMMER, Assistant Examiner

U.S. Cl. X.R.
260—207, 207.1